United States Patent [19]

Slager

[11] Patent Number: 4,514,106
[45] Date of Patent: Apr. 30, 1985

[54] TABLE UPRIGHT CONNECTOR MEMBER AND PROCESS FOR MAKING THE SAME

[76] Inventor: Mark T. Slager, 53654 Bruce Dr., Bristol, Ind. 46507

[21] Appl. No.: 464,776

[22] Filed: Feb. 7, 1983

[51] Int. Cl.³ .............................................. F16B 7/08
[52] U.S. Cl. .................................. 403/190; 403/233; 411/34; 285/197
[58] Field of Search ............. 403/190, 191, 237, 235, 403/233; 285/197; 411/34

[56] References Cited

U.S. PATENT DOCUMENTS

| | | | |
|---|---|---|---|
| 1,322,801 | 11/1919 | Lewis | 403/190 |
| 1,908,821 | 5/1933 | Cornell | 285/197 |
| 2,278,760 | 4/1942 | Baumker | 403/167 |
| 2,643,706 | 6/1953 | Brown | 403/388 |
| 2,919,149 | 12/1959 | Farley | 403/190 |
| 3,257,889 | 6/1966 | Fischer | 411/34 X |
| 3,414,301 | 12/1968 | Crowe | 403/260 X |
| 3,425,722 | 2/1969 | McCauley | 403/191 X |
| 3,806,031 | 4/1974 | Olson | 285/197 X |
| 4,007,993 | 2/1977 | Schwartz | 403/191 X |
| 4,133,464 | 1/1979 | Kelty | 403/190 X |
| 4,253,224 | 3/1981 | Hickman et al. | 285/197 X |

Primary Examiner—Richard J. Scanlan, Jr.
Attorney, Agent, or Firm—Gordon W. Hueschen

[57] ABSTRACT

There is disclosed a table upright connector member or T-joint useful for joining tubular members comprising a tubular cross-member and a tubular stem member and to a process for effecting the same. The T-joint comprises a tubular segment complementary with the tubular cross-member and rigidly secured to the end of the tubular stem member and having a diameter slightly less than that of the tubular cross-member. The tubular segment is drawn up tight against the tubular cross-member by draw bolts to give a rigid structure.

2 Claims, 5 Drawing Figures

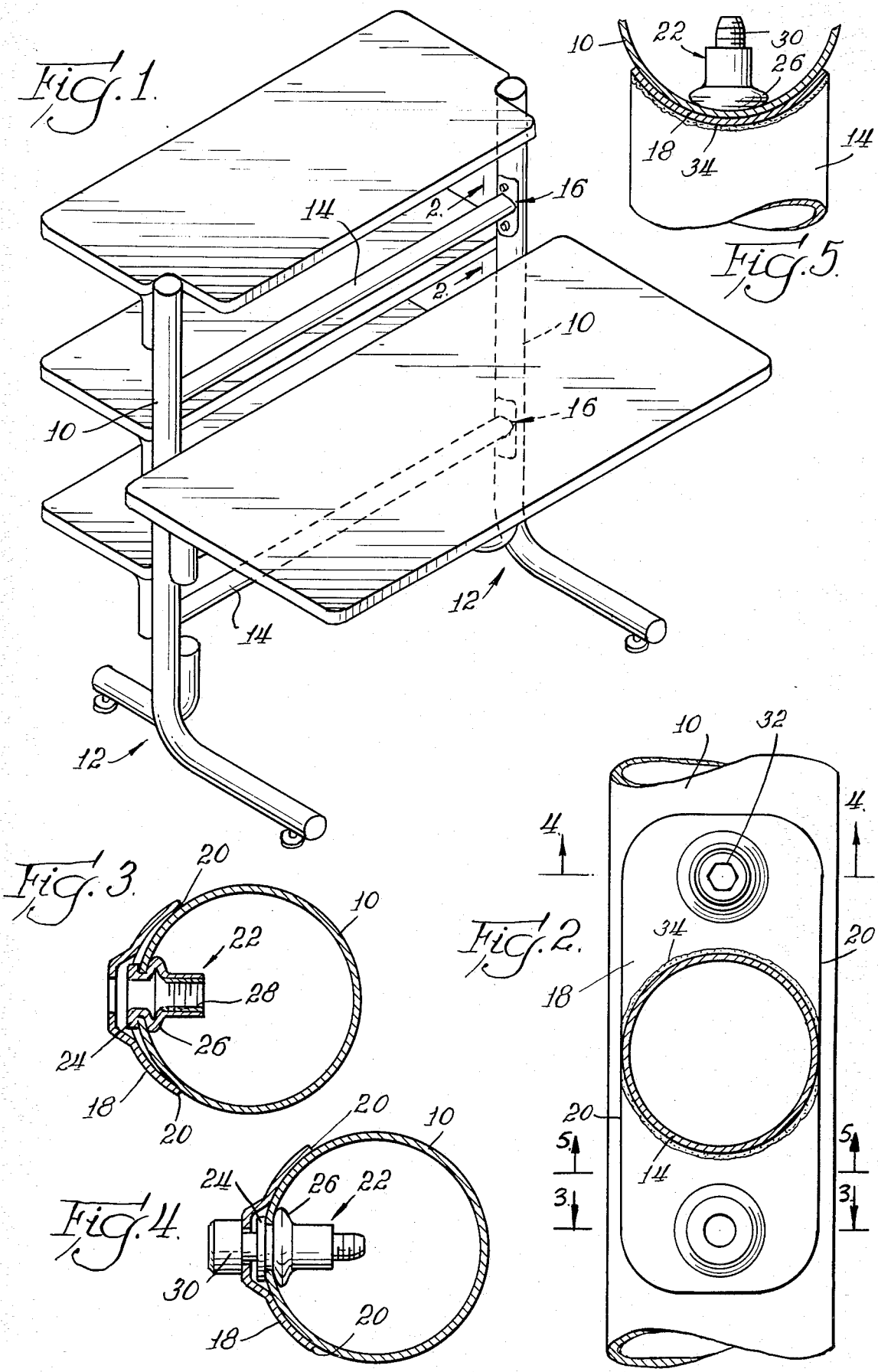

TABLE UPRIGHT CONNECTOR MEMBER AND PROCESS FOR MAKING THE SAME

BACKGROUND OF THE INVENTION

1. Field of Invention

The invention relates to a table upright connector member and particularly to a T-joint useful therein for joining tubular members comprising a tubular cross-member and a tubular stem member and to a process for effecting the same.

2. Prior Art

In making furniture and like devices from tubular stock, T-joints are commonly effected by swaging a nut in the end of the stem member and fastening it to the cross-member by a bolt passing therethrough into the nut thus provided. It has been proposed to effect the joint by welding or by various clamping means. These prior art devices, however, have the disadvantage of weakening the tubular structure, of being cumbersome and expensive, of not giving the desired rigidity and permanence, and of not giving the desired aesthetic appearance.

OBJECTS OF THE INVENTION

It is an object of the invention to provide an improved T-joint for effecting joinder of tubular members comprising a tubular cross-member and a tubular stem member and to an improved process for effecting the joinder. It is a further object of the invention to provide an improved T-joint of the class described which is simple and effective, gives a strong, permanent joinder, and does not detract from the aesthetic appearance of the finished device. Further objects of the invention are to avoid the disadvantages of the prior art and to obtain such advantages as will appear as the description proceeds.

SUMMARY OF THE INVENTION

The invention relates to improvements in a T-joint between tubular members comprising a tubular cross-member and a tubular stem-member, which comprises:

a tubular segment complementary to said tubular cross-member and rigidly secured to the end of said stem member and having a diameter slightly less than that of said tubular cross-member;

draw-means for drawing said tubular segment onto said tubular cross-member in such a manner that the edges of said tubular segment first engage the tubular cross-member and are sprung apart until the inner surface of said tubular segment is in engagement with the outer surface of said tubular cross-member.

The invention also may embody one or more additional features in which said draw-means comprises nuts riveted into the wall of said tubular cross-member and bolts threaded therein having heads adapted to engage the outer surface of said tubular segment, in which said nuts have a stem portion passing through the wall of said tubular cross-member, a head portion abutting the outside of the wall of said tubular cross-member, and a malleable portion upset into contact with the inner wall of said tubular cross-member in such a way that the wall around said stem is clamped between said head portion and said malleable portion, in which said tubular segment has depressions therein to receive the heads of said nuts and, in which the chord dimension of the tubular segment is substantially the diameter of the tubular stem member and the tubular stem member is welded onto said tubular segment along substantially 360° of contact, whereby the resistance of the tubular segment to being sprung is enhanced.

The invention also is directed to improvements in a process for effecting a T-joint between tubular members comprising a tubular cross-member and a tubular stem member, which comprises:

placing a tubular segment complementary to said tubular cross-member and rigidly secured to the end of said stem member and having a diameter slightly less than that of said tubular cross-member against said tubular cross-member with the edges thereof touching the surface of said tubular cross-member;

drawing said tubular segment over to said tubular cross-member in such a manner that the edges of said tubular segment after engaging the tubular cross-member are sprung apart until the inner surface of said tubular segment is in engagement with the outer surface of said tubular cross-member.

The process of the invention also may include one or more additional features in which said drawing step is effected by bolts threaded into nuts riveted into the wall of said tubular cross-member, and in which said nuts have a stem portion, a head portion, and a malleable portion, and which further comprises the step of inserting the stem portion through a hole in the wall of said tubular cross-member with said head portion against the outer wall thereof and upsetting said malleable portion against the inner surface of said tubular cross-member to clamp it between the upset portion and the head portion.

To avoid any misunderstanding, it is hereby stated that although, in the table embodiment of the invention specifically illustrated in this application, a cross-member forms a T-connection or T-joint with a vertical member, in the T-joint itself the same "cross-member" constitutes the "stem" member of the T-joint and the vertical member in fact constitutes the "cross-member" of the T-joint. The respective members are therefore so referred to hereinafter unless the context makes it clear that it is otherwise intended.

The invention also comprises a table having a first tubular member connected to a second tubular member by means of a T-joint comprising:

a tubular segment complementary to said first tubular member and rigidly secured to the end of said second tubular member and having a diameter slightly less than that of said first tubular member;

draw-means for drawing said tubular segment onto said first tubular member in such a manner that the edges of said tubular segment first engage the first tubular member and are sprung apart until the inner surface of said tubular segment is in engagement with the outer surface of said first tubular member and to the corresponding process.

BRIEF DESCRIPTION OF THE DRAWINGS

In the drawings:

FIG. 1 is an isometric of an article of furniture in which the invention is utilized;

FIG. 2 is a detail side view of a T-joint according to the invention, taken along line 2—2 of FIG. 1;

FIG. 3 is a cross-section taken along line 3—3 of FIG. 2 before the partial segment is drawn up tight against the tubular member;

FIG. 4 is a cross-section taken along line 4—4 of FIG. 2 after the tubular segment has been drawn up tight against the tubular cross-member; and FIG. 5 is a partial view in section taken along line 5—5 of FIG. 3.

DESCRIPTION OF THE PREFERRED EMBODIMENTS

In FIG. 1 there is illustrated a table suitable for use in conjunction with small computers and the like. It comprises two parallel vertically-disposed tubular supporting members 10 supported by suitable bases 12 and held in rigid relation by tubular transverse members 14 which are joined to the vertical tubular members by T-joints 16. The transverse member 14 forms the stem member of the two T-joints 16 and the upright supporting member 10 forms the cross-members of the T-joints 16.

FIGS. 2, 3, 4, and 5 show detail of the construction of the T-joint 16.

Welded to the end of the transverse tubular member 14 which constitutes the stem member of the T-joint is a tubular segment 18. This segment has a width substantially the same as the outside diameter of the tubular member 14 and is welded thereto around substantially 360 degrees, as illustrated in FIGS. 2 and 5. Thus, the chord dimension of the segment is essentially the same as the diameter of the tube 14.

The tubular segment 18 is elongated axially, as shown in FIG. 2 to provide room for bolt holes for bolting the segment to the vertical tube or cross-member of the T-joint.

The tubular segment 18 is curved on a radius slightly smaller than the radius of the tubular cross-member 10, as best seen in FIG. 3, so that the edges 20 thereof, which are parallel to the elements of the tubular member 10, lie on the surface of the tubular member 10.

The tubular member 10 has a nut 22 riveted therein with the head 24 of the nut abutting the outside of the tubular member 10 and an inner portion thereof upset as shown at 26 to clamp the wall of the tubular member 10 between the upset portion 26 and the head 24. A threaded sleeve 28 is provided interiorally of the upset portion 26.

Nuts of this character are well known in the art and are comprised of a head 24, a threaded sleeve 28, and an intermediate malleable portion so that, when the nut is inserted into a tube through a hole of suitable diameter, the malleable portion can be upset by a suitable tool into the form shown in FIG. 3. This imparts the necessary strength and rigidity to the tube 10 for effecting the operation to be described.

With the tubular segment 18 in the position shown in FIG. 3, a bolt 30 is inserted and threaded into threads 28 and drawn up tight to the position shown in FIG. 4. It is of advantage to use an Allen-head bolt as shown at 32 in order to get the necessary leverage to spring the tubular segment 28 from the position shown in FIG. 3 to that shown in FIG. 4.

The force necessary to thus spring the tubular segment 18 is greatly enhanced by the structure shown in FIG. 5 where the tubular member 14 is shown welded to the tubular segment 18, by welding seam 34, which extends substantially 360 degrees around the tubular member 14.

Considering that the tubular members 10 and 14 are commonly made of heavy gauge tubing, it will readily be apparent that an enormous force is necessary to spring the tubular segment 18 to the position shown in FIG. 4. Even if it is not made of particularly heavy gauge metal, the fact that the tubular member 14 is welded thereto, down to the very edges of the tubular segment 18, insures one that, when the tubular segment 18 is sprung to the position shown in FIG. 4, it is clamped up against the tubular member 10 so tightly, that no movement between the tubular member 10 and the transverse members 14 takes place and there is little if any likelihood of any inadvertent loosening of the bolts 30. The combination of the tubular segment 18 of smaller diameter than that of the tube 10 and the swaged-in-place nuts makes possible the accomplishment of these new and unexpected results.

It is to be understood that the invention is not to be limited to the exact details of construction, operation, or exact materials or embodiments shown and described, as various modifications and equivalents will be apparent to one skilled in the art, and the invention is therefore to be limited only the full scope of the appended claims.

I claim:

1. In a T-joint between tubular members comprising a tubular cross-member and a tubular stem member, the improvement which comprises:

a tubular segment complementary to said tubular cross-member and rigidly secured to the end of said stem member and having a radius of curvature slightly less than that of said tubular cross-member;

draw means for drawing said tubular segment onto said tubular cross-member in such a manner that the edges of said tubular segment first engage the tubular cross-member and are sprung apart until the inner surface of said tubular segment is in engagement with the outer surface of said tubular cross-member, said draw means comprising nuts having head portions and stem portions and being riveted into the wall of said tubular cross-member and bolts threaded therein having heads adapted to engage the outer surface of said tubular segment on each side of said tubular stem member, said head portions projecting above said stem portions passing through the wall of said tubular cross-member, said head portions abutting the outside of the wall of said tubular cross-member, and malleable portions integral with said stem portions and said head portions, said malleable portions being upset into contact with the inner wall of said tubular cross-member in such a way that the wall around said stem portion is clamped between said head portions and said malleable portions, said head portions projecting above the surface of said tubular member, said tubular segment having depressions therein to receive the head portions of said nuts, which depressions have holes therein through which said bolts project and a flat outer surface on which the heads of said bolts seat, and in which the chord dimension of the tubular segment is substantially the diameter of the tubular stem member and the tubular stem member is welded onto said tubular segment along substantially 360° of contact, whereby the resistance of the tubular segment to being sprung is enhanced.

2. In a table having a first tubular member connected to a second tubular member, the improvement in which one tubular member is connected to the other tubular member by means of a T-joint comprising:

a tubular segment complementary to said first tubular member and rigidly secured to the end of said second tubular member and having a radius of curvature slightly less than that of said first tubular member;

draw-means for drawing said tubular segment onto said first tubular member in such a manner that the edges of said tubular segment first engage the first tubular member and are sprung apart until the inner surface of said tubular segment is in engagement with the outer surface of said first tubular member, said draw means comprising nuts riveted into the wall of said first tubular member and bolts threaded therein having heads adapted to engage the outer surface of said tubular segment on each side of said second tubular member, said nuts having a stem portion passing through the wall of said first tubular member, a head portion abutting the outside of the wall of said first tubular member, and a malleable portion integral with said stem portion and said head portion, said malleable portion being upset into contact with the inner wall of said first tubular member in such a way that the wall around said stem is clamped between said head portion and said malleable portion, said head portions projecting above the surface of said tubular member, said tubular segment having depressions therein to receive the head portions of said nuts, which depressions have holes therein through which said bolts project and a flat outer surface on which the heads of said bolts seat, and in which the chord dimension of the tubular segment is substantially the diameter of the second tubular member and the second tubular member is welded onto said tubular segment along substantially 360° of contact, whereby the resistance of the tubular segment to being sprung is enhanced.

* * * * *

UNITED STATES PATENT AND TRADEMARK OFFICE
CERTIFICATE OF CORRECTION

PATENT NO. : 4,514,106
DATED : April 30, 1985
INVENTOR(S) : Mark T. Slager

It is certified that error appears in the above-identified patent and that said Letters Patent is hereby corrected as shown below:

Col. 4, line 20; after "only" insert -- by --

Col. 4, line 50; "portion" should read -- portions --

Signed and Sealed this

Eighth Day of October 1985

[SEAL]

Attest:

Attesting Officer

DONALD J. QUIGG

Commissioner of Patents and Trademarks—Designate